United States Patent [19]

Hirschberg et al.

[11] 4,370,148

[45] Jan. 25, 1983

[54] CHLOROFLUOROFERRATE(II,III), A PROCESS FOR ITS MANUFACTURE, ITS USE AND A GRINDING WHEEL CONTAINING CHLOROFLUOROFERRATE(II,III)

[75] Inventors: Rudolf Hirschberg; Bernd Schönfeld, both of Bad Nenndorf, Fed. Rep. of Germany

[73] Assignee: Riedel-De Haen Aktiengesellschaft, Seelze/Hanover, Fed. Rep. of Germany

[21] Appl. No.: 281,845

[22] Filed: Jul. 9, 1981

[30] Foreign Application Priority Data

Jul. 11, 1980 [DE] Fed. Rep. of Germany ....... 3026294

[51] Int. Cl.³ .......................... C09C 1/02; C01G 49/00
[52] U.S. Cl. ...................................... 51/293; 51/307; 423/466; 423/463
[58] Field of Search ....................... 423/462, 463, 466; 51/293, 309

[56] References Cited

U.S. PATENT DOCUMENTS

| 2,010,873 | 8/1935 | Martin | 51/298 |
|---|---|---|---|
| 3,111,401 | 11/1963 | Cohen | 51/307 |
| 3,407,031 | 10/1968 | Fuerer | 423/463 |
| 3,729,543 | 4/1973 | Dunn | 423/463 |
| 3,944,647 | 3/1976 | Bonsack | 423/72 |
| 4,111,668 | 9/1978 | Walker | 51/309 |
| 4,157,898 | 6/1979 | Walker | 51/309 |
| 4,263,016 | 4/1981 | Hirschberg | 423/463 |

FOREIGN PATENT DOCUMENTS

| 452927 | 7/1972 | Australia . | |
|---|---|---|---|
| 8413 | 3/1980 | European Pat. Off. . | |
| 2110611 | 9/1972 | Fed. Rep. of Germany . | |
| 2835542 | 2/1980 | Fed. Rep. of Germany | 423/463 |
| 85063 | 10/1971 | German Democratic Rep. | 423/463 |
| 1362660 | 8/1974 | United Kingdom . | |

OTHER PUBLICATIONS

Leech et al., *J. Inorg. Nucl. Chem.,* (1975), vol. 37, pp. 2279–2282.

*Primary Examiner*—Brian E. Hearn
*Attorney, Agent, or Firm*—Curtis, Morris & Safford

[57] ABSTRACT

Chlorofluoroferrates(II,III) are manufactured by fusing alkali metal halides or ammonium halides with an iron-(III) halide and metallic iron. The starting materials used are, in particular, (a) an alkali metal chloride or ammonium chloride, (b) an alkali metal fluoride or ammonium fluoride, (c) anhydrous iron(III) chloride and (d) iron powder. The reaction is carried out a temperature of 300° to 900° C. The chlorofluoroferrates, which have a markedly lower hygroscopicity compared with customary chloroferrates, are particularly suitable for use as active fillers for grinding wheels.

8 Claims, No Drawings

CHLOROFLUOROFERRATE(II,III), A PROCESS FOR ITS MANUFACTURE, ITS USE AND A GRINDING WHEEL CONTAINING CHLOROFLUOROFERRATE(II,III)

The invention relates to chlorofluoroferrate(II,III), a process for its manufacture by fusing alkali metal halides or ammonium halides with an iron(III) halide and metallic iron, its use as a filler in grinding wheels and a grinding wheel containing this filler.

The preparation of anhydrous chloroferrate complexes by heating an alkali metal chloride with hydrated ferric chloride and removing the water of hydration is already known. In this process the starting materials are used in approximately equal molar quantities and the reaction is carried out at a temperature within the range from 40° C. to about 310° C. (compare German Offenlegungsschrift 2,110,611, equivalent to U.S. Pat. No. 3,729,543).

It is also known that anhydrous alkali metal chloroferrates(II,III) of the formula $$A_xFe_y^{++}Fe_z^{+++}Cl_{x+2y+3z}$$

wherein A is an alkali metal ion or ammonium ion, x is a number from 1 to 10, y is a figure varying from greater than zero to not more than 1 and z is a figure from 0 to 1, are prepared by fusing with one another an alkali metal chloride or ammonium chloride, anhydrous iron(III) chloride and iron powder. The temperature of fusion in this process is 400° C. or even 700° C. (compare German Offenlegungsschrift No. 2,835,542). These alkali metal chloroferrates(II,III) are suitable as active fillers for grinding wheels; they are employed (compare German Offenlegungsschrift No. 2,835,543) in quantities of 5 to 10 percent (relative to the weight of the grinding wheel).

The object of the invention is to provide a halogenoferrate which can be manufactured in an economical manner, has a low hygroscopicity and is suitable for use as an active filler for grinding wheels.

The invention relates to a chlorofluoroferrate(II,III) of the formula (1)

$$A_xFeCl_yF_z \quad (1)$$

in which A is an alkali metal ion or an ammonium ion, x is a number from 1 to 10, y is a figure from 0.1 to 12.9, z is a figure from 0.1 to 12.9 and the total of y+z is at least 3. The alkali metal ion is preferably a lithium ion, a sodium ion or a potassium ion. Examples of compounds, according to the invention, of the formula (1) are sodium dichlorofluoroferrate $NaFeCl_2F$, disodium trichlorofluoroferrate $Na_2FeCl_3F$ and tetrasodium pentachlorofluoroferrate $Na_4FeCl_5F$ and also potassium dichlorofluoroferrate $KFeCl_2F$, dipotassium trichlorofluoroferrate $K_2FeCl_3F$ and tetrapotassium pentachlorofluoroferrate $K_4FeCl_5F$ and also mixed chlorofluoroferrates, such as sodium tripotassium pentachlorofluoroferrate $NaK_3FeCl_5F$ and ammonium tripotassium pentachlorofluoroferrate $NH_4K_3FeCl_5F$.

A chlorofluoroferrate(II,III) of the formula (2)

$$K_xFeCl_yF_z \quad (2)$$

in which x is a number from 1 to 6, y is a figure from 2 to 8 and z is a figure from 1 to 2 and the total of y+z is at least 3, is particularly valuable.

The invention also relates to a process for the manufacture of a halogenoferrate by fusing alkali metal halides or ammonium halides with an iron(III) halide and metallic iron, which comprises fusing a mixture composed of (a) an alkali metal chloride or ammonium chloride, (b) an alkali metal fluoride or ammonium fluoride, (c) anhydrous iron(III) chloride and (d) iron powder at a temperature of 300° to 900° C. in order to manufacture a chlorofluoroferrate(II,III) of the formula (1)

$$A_xFeCl_yF_z \quad (1)$$

in which A is an alkali metal ion or an ammonium ion, x is a number from 1 to 10, y is a figure from 0.1 to 12.9, z is a figure from 0.1 to 12.9 and the total of y+z is at least 3.

The invention also relates to the use of a chlorofluoroferrate(II,III) of the formula (1), and particularly of the formula (2), as a filler for grinding wheels, and to the grinding wheel containing a chlorofluoroferrate(II,III) of this type as a filler.

The chlorofluoroferrates according to the invention are prepared in a technically simple and economical manner by fusing a mixture composed of (a) an alkali metal chloride or ammonium chloride, (b) an alkali metal fluoride or ammonium fluoride, (c) anhydrous iron(III) chloride and (d) iron powder. The temperature of fusion is normally 300° to 900° C., preferably 400° to 800° C. Suitable alkali metal chlorides are lithium chloride, sodium chloride and, in particular, potassium chloride, and suitable alkali metal fluorides are lithium fluoride, sodium fluoride and, in particular, potassium fluoride. The quantity of starting materials employed in accordance with the process depends on the composition of the end product desired in a particular case. Per mole of iron, component (a) is used in a quantity of 0.3 to 30 moles, preferably 3 to 15 moles, component (b) is used in a quantity of 0.3 to 30 moles, preferably 1 to 3 moles, and component (c) is used in a quantity of 2 to 3 moles, preferably 2.0 to 2.1 moles.

Any vessel which can be heated and the walls of which are not attacked by the melt, for example an iron kettle, is suitable as a reaction vessel for carrying out the fusion process mentioned above.

Depending on the quantity of starting materials and the reaction temperature, the reaction requires a period of 1 to 4 hours, preferably 2 to 3 hours. The reaction can be accelerated by subjecting the reaction mixture for a short time to mechanical mixing, for example by stirring, after it has been fused to give a homogeneous melt. When the reaction is complete, the melt is allowed to solidify in the reaction vessel and is then comminuted at room temperature, for example by grinding. However, the melt can also be discharged from the reaction vessel and brought into a comminuted form by means of a cooling unit, for example a chill roll or a chilling screw.

The chlorofluoroferrates according to the invention are particularly suitable for use as active fillers for grinding wheels. Their effectiveness on most steel grades is equivalent to the effectiveness of the known chloroferrates, but they have a markedly lower hygroscopicity. In respect of some specific steel grades, for example V-steels, chlorofluoroferrates are more effective than chloroferrates. The chlorofluoroferrates are employed either on their own or as a mixture with one another or as a mixture with other fillers; iron sulfides, for example pyrite, are preferentially suitable as additional fillers.

The examples which follow serve to illustrate the invention in greater detail. In these examples, percentages refer in each case to weight.

EXAMPLE 1

A mixture composed of 112 kg (1.5 kmoles) of potassium chloride, 29 kg (0.5 kmole) of potassium fluoride, 54 kg (0.33 kmole) of anhydrous iron(III) chloride and 9.3 kg (0.167 kmole) of iron powder in an iron kettle having a volume of 250 l was heated, in the course of 2 hours, to a temperature of 750° C., in the course of which a homogeneous melt was formed. This melt was stirred a few times in order to complete the reaction. After the melt cooled, 204 kg of a grey, crystalline mass having the composition $K_4FeCl_5F$ were obtained.

EXAMPLE 2

A mixture composed of 37 kg (0.5 kmole) of potassium chloride, 29 kg (0.5 kmole) of potassium fluoride, 54 kg (0.33 kmole) of anhydrous iron(III) chloride and 9.3 kg (0.167 kmole) of iron powder in an iron kettle having a volume of 250 l was heated, in the course of 2 hours, to a temperature of 800° C., in the course of which a homogeneous melt was formed. This melt was stirred a few times in order to complete the reaction and was then left to cool. 129 kg of a grey, crystalline mass of the composition $K_2FeCl_3F$ were obtained.

EXAMPLE 3

(a) Grinding wheels each having a diameter of 60 cm, a thickness of 7.5 mm and a weight of 5 kg were produced using a mixture composed of 20 percent of a commercially available phenol-formaldehyde resin having a melting range of 110° to 120° C., 64 percent of corundum powder, 8 percent of pyrite and 8 percent of one of each of the chlorofluoroferrates obtained in accordance with Examples 1 and 2. Similar wheels were produced for comparison, using $K_2FeCl_4$ as the active filler.

(b) The wheels were set in rotation on a commercially available grinding machine at an increasing peripheral speed until they shattered. The highest peripheral speed in each case is quoted in the table below under "shattering speed".

(c) Wheels of the same composition were employed for abrasive cutting of rod-shaped components having a square cross-section (10 cm×10 cm), from an alloy standardized for testing purposes ("CK 45 normalized"). The cuts were carried out perpendicularly to the longitudinal axis of each component, the peripheral speed being 100 m/second in each case and the power input of the grinding machine being 125 A in each case. After a specific number of cuts, the loss in diameter per cut, the specific cutting performance (=diminution in the component per unit of time) and the performance factor (=quotient obtained by dividing the diminution in the component by the diminution in the cross-section of the wheel) were determined. The figures determined in each case are listed in the table which follows.

(d) The hygroscopicity was determined by measuring the increase in weight of the chlorofluoroferrates prepared in accordance with Examples 1 and 2 after they had been stored at a relative atmospheric humidity of 60% and a temperature of 20° C.; the storage time was 10 hours and 100 hours in each case. For comparison, the known filler $K_2FeCl_4$ was examined similarly. The figures determined are contained in the table which follows.

TABLE

| Filler | $K_2FeCl_4$ | $K_4FeCl_5F$ | $K_2FeCl_3F$ |
|---|---|---|---|
| Shattering speed (m/second) | 156 | 154 | 153 |
| Number of cuts | 3 × 5 | 3 × 5 | 2 × 5 |
| Loss in diameter (mm) | 19 | 14 | 16 |
| Specific cutting performance (cm²/second) | 6.8 | 7.0 | 7.1 |
| Performance factor | 3.1 | 4.0 | 3.6 |
| Increase in weight (%) | | | |
| after 10 hours | 2.6 | 0.5 | 0.6 |
| after 100 hours | 8.2 | 2.5 | 3.3 |

We claim:

1. A chlorofluoroferrate(II,III) of the formula (1)

$$A_xFeCl_yF_z \qquad (1)$$

in which A is an alkali metal ion or an ammonium ion, x is a number from 1 to 10, y is a figure from 0.1 to 12.9, z is a figure from 0.1 to 12.9 and the total of y+z is at least 3.

2. A process for the manufacture of a halogenoferrate by fusing alkali metal halides or ammonium halides with an iron(III) halide and metallic iron, which comprises fusing a mixture composed of (a) an alkali metal chloride or ammonium chloride, (b) an alkali metal fluoride or ammonium fluoride, (c) anhydrous iron(III) chloride and (d) iron powder at a temperature of 300° to 900° C. in order to manufacture a chlorofluoroferrate(II,III) of the formula (1)

$$A_xFeCl_yF_z \qquad (1)$$

in which A is an alkali metal ion or an ammonium ion, x is a number from 1 to 10, y is a figure from 0.1 to 12.9, z is a figure from 0.1 to 12.9 and the total of y+z is at least 3.

3. A grinding wheel comprising an abrasive material, a binder and, as filler, a chlorofluoroferrate (II,III) of the formula $$A_xFeCl_yF_z$$

in which A is an alkali metal ion or an ammonium ion, x is a number from 1 to 10, y is a figure from 0.1 to 12.9, z is a figure from 0.1 to 12.9 and the total of y+z is at least 3.

4. A grinding wheel as defined in claim 3 in which A is an alkali metal ion, x is 1 to 6, y is 2 to 8 and z is 1 to 2.

5. A grinding wheel as defined in claim 3 in which A is a potassium ion, x is 1 to 4, y is 2 to 5, z is 1 and y+z are equal to 3 to 6.

6. A process for making a grinding wheel comprising an abrasive material, a binder and a filler, which comprises admixing, as a filler with the abrasive material and the binder, a chlorofluoroferrate (II,III) of the formula $$A_xFeCl_yF_z$$

in which A is an alkali metal ion or an ammonium ion, x is a number from 1 to 10, y is a figure from 0.1 to 12.9, z is a figure from 0.1 to 12.9 and the total of y+z is at least 3.

7. A process as defined in claim 6 in which the chlorofluoroferrate is one in which x is 1 to 6, y is 2 to 8 and z is 1 to 2.

8. A process as defined in claim 6 in which the y and z are equal to 3 to 6.

* * * * *